United States Patent
Guo

(10) Patent No.: US 7,821,937 B1
(45) Date of Patent: Oct. 26, 2010

(54) NETWORK PROTOCOL WITH DAMAGE LOSS RESILIENT CONGESTION CONTROL ALGORITHM

(75) Inventor: Fanglu Guo, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 252 days.

(21) Appl. No.: 11/771,204

(22) Filed: Jun. 29, 2007

(51) Int. Cl.
*H04L 12/26* (2006.01)

(52) U.S. Cl. .................... 370/232; 370/231; 370/230.1; 370/233; 370/237

(58) Field of Classification Search .................. None
See application file for complete search history.

(56) References Cited

U.S. PATENT DOCUMENTS

| | | | |
|---|---|---|---|
| 6,493,316 B1 | 12/2002 | Chapman | |
| 6,622,172 B1 | 9/2003 | Tam | |
| 6,643,496 B1 * | 11/2003 | Shimoyama et al. | 455/69 |
| 6,700,876 B1 | 3/2004 | Dinicola | |
| 6,741,555 B1 * | 5/2004 | Li et al. | 370/229 |
| 6,757,248 B1 | 6/2004 | Li | |
| 6,975,591 B1 | 12/2005 | Shorey | |
| 6,993,689 B2 * | 1/2006 | Nagai et al. | 714/717 |
| 7,020,083 B2 * | 3/2006 | Garcia-Luna-Aceves et al. | 370/230 |
| 7,061,856 B2 * | 6/2006 | Banerjee | 370/216 |
| 7,177,300 B2 * | 2/2007 | Murakami et al. | 370/349 |
| 7,284,047 B2 * | 10/2007 | Barham et al. | 709/224 |
| 7,355,997 B2 * | 4/2008 | Qian et al. | 370/328 |
| 2002/0004841 A1 * | 1/2002 | Sawatari | 709/232 |
| 2005/0232151 A1 * | 10/2005 | Chapweske et al. | 370/231 |
| 2006/0018257 A1 * | 1/2006 | Seo | 370/232 |
| 2007/0081462 A1 * | 4/2007 | Gefflaut et al. | 370/235 |
| 2007/0086335 A1 * | 4/2007 | McCanne et al. | 370/229 |
| 2007/0223584 A1 * | 9/2007 | Nagai et al. | 375/240.12 |
| 2007/0258383 A1 * | 11/2007 | Wada | 370/252 |
| 2008/0043625 A1 * | 2/2008 | Cohen et al. | 370/236 |
| 2008/0117819 A1 * | 5/2008 | Flott et al. | 370/232 |

OTHER PUBLICATIONS

"TCP Vegas: New Techniques for Congestion Detection and Avoidance," Brakmo, et al, ACM SIGCOMM Computer Communication Review, Oct. 1994, http://www.cs.cornell.edu/courses/cs619/2004fa/documents/brakmo94tcp.pdf.
"FAST TCP: Motivation, Architecture, Algorithms, Performance," Jin et al., Mar. 2004, http://netlab.caltech.edu/publications/FAST-ToN-final-060209-2007.pdf.

* cited by examiner

*Primary Examiner*—Huy D Vu
*Assistant Examiner*—Zewdu Beyen
(74) *Attorney, Agent, or Firm*—Meyertons, Hood, Kivlin, Kowert & Goetzel, P.C.

(57) ABSTRACT

Various embodiments of a network protocol that utilizes a congestion control algorithm that distinguishes between congestion loss and damage loss are described. In response to a packet loss on a network, a delay-based detection algorithm may be performed based on RTT (Round-Trip Time) information to determine whether the network is congested. If the delay-based detection algorithm does not determine that the network is congested then a consistency-based detection algorithm may be performed based on packet loss rate information. If either the delay-based detection algorithm or the consistency-based detection algorithm determine that the network is congested then the rate of data transmission may be reduced, e.g., by reducing a congestion window size.

9 Claims, 6 Drawing Sheets

```
counter = 0;
damage_loss = 0;
DLR = 0;

consistency_based_detection()
{
    if(detect packet loss)
    {
        compute loss_rate
        if(loss rate > DLR)
        {
            counter ++;
        }
        else
        {
            counter = 0;
        }
        if(counter > consistency_threshold)
        {
            back off;
            congestionRTT = current RTT;
        }
    }
} delay_based_detection()
{
    if(detect packet loss)
    {
        delay_threshold = baseRTT
            + 0.5 * (congestionRTT - baseRTT);
        if(current RTT > delay_threshold)
        {
            back off;
        }
        else
        {
            damage_loss ++;
        }
    }
}

// called for each received ack
detect_congestion()
{
    delay_based_detection();

if (no back off)
    {
        consistency_based_detection();
    } if (no back off)
    {
        w += 1/w; //increase congestion window w
    }
    else
    {
        w = w/2; //decrease congestion window w
    } if(transmitted_packets >= 100000)
    {
        DLR = damage_loss / transmitted_packets;
        damage_loss = transmitted_packets = 0;
    }
}
```

FIG. 6

NETWORK PROTOCOL WITH DAMAGE LOSS RESILIENT CONGESTION CONTROL ALGORITHM

BACKGROUND OF THE INVENTION

1. Field of the Invention

This invention relates to network protocols for sending data packets over a computer network. More particularly, the invention relates to a network protocol that utilizes a congestion control algorithm that distinguishes between congestion loss and damage loss.

2. Description of the Related Art

Transmission Control Protocol (TCP) is a commonly used network protocol for sending data on the Internet and other computer networks. A sender node sends data to a receiver node by dividing the data into multiple packets and sending each packet separately over the network. The receiver node returns an acknowledgement (ACK) message to acknowledge receipt of each packet.

When the network is congested due to insufficient bandwidth for all the packets sent over the network, some of the packets are lost. When TCP on the sender node detects that packets are being lost, the rate at which the packets are transmitted over the network to the receiver node is reduced in order to reduce the network congestion and avoid sending the same packets multiple times.

Packet loss due to network congestion is referred to as congestion loss. Packets may also be lost due to damage loss (also referred to as random loss) caused by network transmission error where packets are dropped because the packets are corrupted by random events (e.g. cosmic rays) unrelated to the network congestion level. However, TCP does not distinguish between these two different kinds of loss and treats all packet loss as congestion loss. When damage loss is present, TCP thinks that the network is congested and decreases its throughput. However, the network may still have abundant unused bandwidth, making such a reaction unwarranted.

Investigation has shown that TCP throughput is very sensitive to packet loss, regardless of the type of loss. Even a very low damage loss rate can dramatically reduce data throughput.

SUMMARY

Various embodiments of a system and method for adjusting a rate of sending packets over a network are disclosed herein. According to one embodiment, a plurality of packets may be sent over the network, and a packet loss may be detected. In response to the packet loss, a recent packet loss rate may be compared to a damage loss rate. A rate of sending subsequent packets over the network may be adjusted depending upon a result of the comparison. In further embodiments, the rate may be adjusted depending upon the result of the comparison and also depending upon results of previous comparisons performed in response to previous packet losses.

According to another embodiment, in response to detecting a packet loss, a first algorithm based on transmission times of packets on the network may be performed, and a second algorithm based on packet loss rate information may be performed. A rate of sending subsequent packets over the network may be adjusted depending upon a result of the first algorithm and a result of the second algorithm. In further embodiments, the first algorithm may operate to detect whether the network is congested, and the second algorithm may be performed in response to determining that the first algorithm did not detect that the network is congested.

BRIEF DESCRIPTION OF THE DRAWINGS

A better understanding of the invention can be obtained when the following detailed description is considered in conjunction with the following drawings, in which:

FIG. 6 illustrates pseudocode corresponding to the method of FIG. 5.

Figure 1:
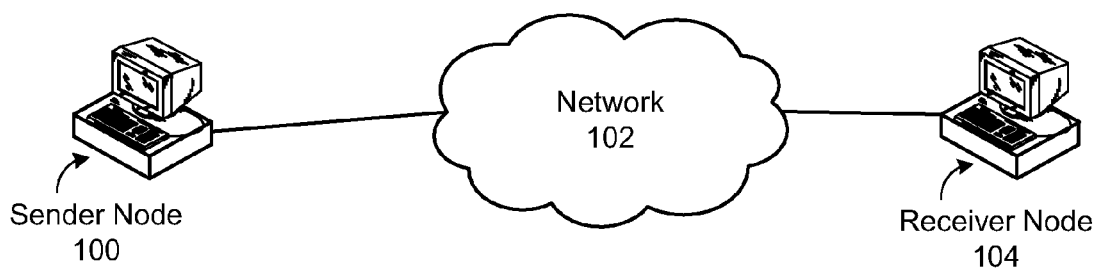
FIG. 1 illustrates a system in which a sender node is coupled through a network to a receiver node, where the sender node sends data packets over the network to the receiver node using a network protocol that is resilient to damage loss.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for adjusting a rate of sending packets over a network are disclosed herein. The system and method may utilize a network protocol which provides a congestion control algorithm that distinguishes between congestion loss and damage loss are described herein. Distinguishing between congestion loss and damage loss may enable the network protocol to reduce the rate of packet transmission when congestion loss is present but to avoid transmission rate reduction when packet loss is due to damage loss. Thus, data throughput may remain high even in the presence of significant damage loss. Various embodiments of the congestion control algorithm may also maintain fairness to network traffic sent by other nodes on the network, e.g., standard TCP traffic.

FIG. 1 illustrates a system in which a sender node 100 is coupled through a network 102 to a receiver node 104. The sender node 100 may send data packets over the network 102 to the receiver node 104 using a network protocol that utilizes a congestion control algorithm that distinguishes between congestion loss and damage loss.

In some embodiments the sender node 100 may utilize a modified version of TCP. For example, network software executing on the sender node 100 may operate to send the data packets to the receiver node 104 much the same as if the sender node 100 were executing standard TCP software. However, instead of using the standard TCP congestion control algorithm, the network software on the sender node 100 may use a congestion control algorithm that distinguishes between congestion loss and damage loss, e.g., according to the methods described below. In some embodiments, the receiver node 104 may execute standard TCP software which communicates with the modified TCP software on the sender node 100. Thus, in some embodiments the sender node 100 may be able to use a damage loss resilient congestion control algorithm such as described herein when communicating with any of various receiver devices that use standard TCP software.

In other embodiments the sender node 100 may utilize a network protocol that is substantially different from TCP. In these embodiments the receiver node 104 may also execute network software other than TCP in order to communicate with the sender node 100. Thus, the methods described herein to distinguish between congestion loss and damage loss when performing congestion control may be applied to any of various kinds of packet-based communication protocols.

The sender node 100 may comprise any kind of device operable to send data packets over the network 102, and the receiver node 104 may comprise any kind of device operable to receive the data packets. Examples of devices that may be utilized as the sender node 100 or receiver node 104 in various embodiments include computing devices, personal computer systems (PCs), workstations, network appliances, personal digital assistants (PDA), mobile phones, television systems, or other devices or combinations of devices.

In various embodiments, the network 102 may include any type of network or combination of networks. For example, the network 102 may include any type or combination of local area network (LAN), a wide area network (WAN), wireless networks, an Intranet, the Internet, etc. Exemplary local area networks include Ethernet networks, Fiber Distributed Data Interface (FDDI) networks, and token ring networks. Also, the sender node 100 and receiver node 104 may each be coupled to the network 102 using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 2:
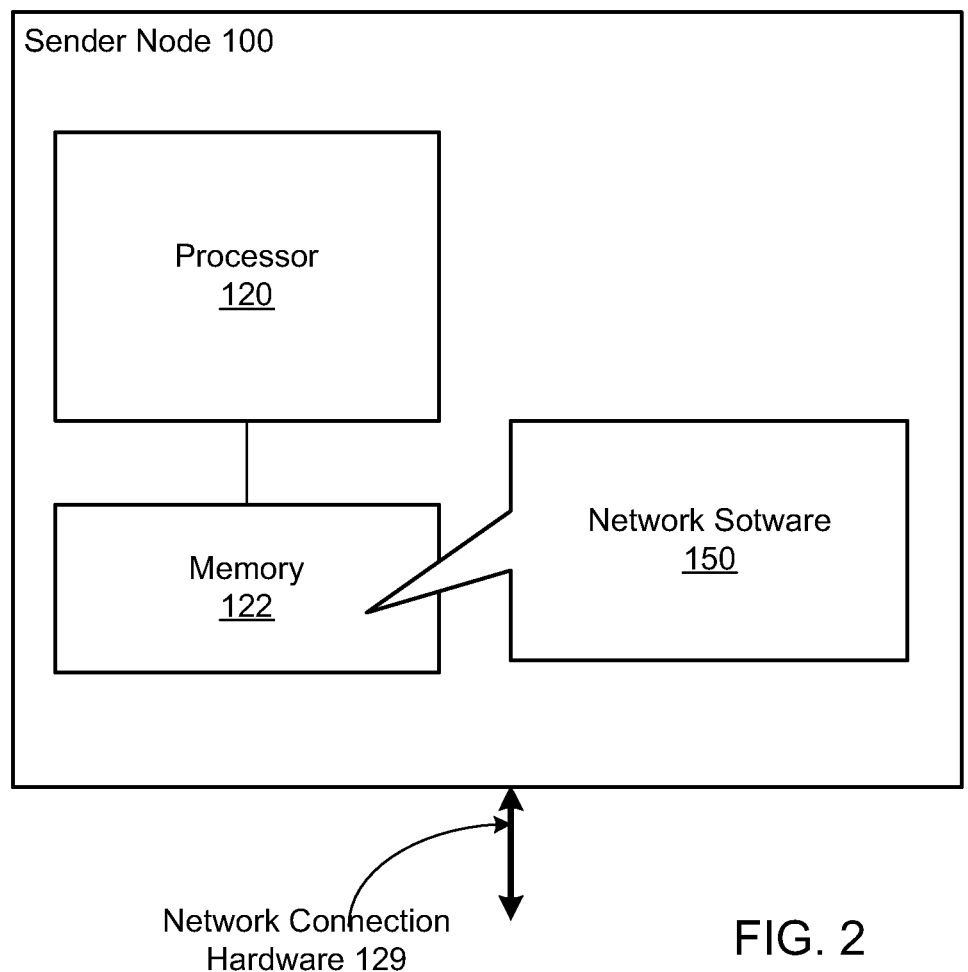
FIG. 2 illustrates an example embodiment of the sender node.

FIG. 2 illustrates an example embodiment of the sender node 100. The sender node 100 includes a processor 120 coupled to a memory 122. The memory 122 may be configured to store program instructions and/or data. In particular, the memory 122 may store network software 150, which operates to send data packets to the receiver node 104 and uses a congestion control algorithm that distinguishes between congestion loss and damage loss. As discussed above, in some embodiments the network software 150 may comprise modified TCP software.

In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The processor 120 may be configured to execute program instructions and to operate on data stored within the memory 122. In particular, the processor 120 may execute the network software 150. It is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the sender node 100 may include multiple processors 120.

In various embodiments the network software 150 executing on the sender node 100 may use various types of methods or combinations of methods to distinguish between congestion loss and damage loss. In some embodiments the network software 150 may use a consistency-based detection method which is based on the observation that congestion loss is typically consistent while damage loss is typically not consistent. The consistency-based detection method is described below with reference to FIG. 3. In some embodiments the network software 150 may also use a delay-based detection method which is based on the observation that congestion loss is associated with a large queuing delay while damage loss is not. The delay-based detection method is described below with reference to FIG. 4. In some embodiments, the consistency-based detection method and the delay-based detection method may be used together so that they compliment each other and work together to detect congestion loss quickly and reliably.

The consistency-based detection method may operate by computing a loss rate sample, referred to herein as the recent loss rate, each time a packet loss is detected. The first time a packet loss is detected, the recent loss rate is computed by dividing the number of lost packets by the number of fully transmitted packets since transmission started. For each subsequent packet loss, a new respective recent loss rate is computed by dividing the number of lost packets by the number of fully transmitted packets since the previous recent loss rate was computed.

It may be seen that the recent loss rate samples computed when packet losses are detected cannot be consistently higher than the long-term damage loss rate (the measured long-term rate of packet loss due to damage loss) if the packet losses are due to damage loss. For example, if the long-term damage loss rate is 1%, it is impossible for every recent loss rate sample to be greater than 1% if the packet losses are due to damage loss because this would make the long-term damage loss rate greater than 1%, which is a contradiction to the assumption. Thus, if the recent loss rate samples are consistently higher than the long-term damage loss rate then it can be concluded that the packet losses are due to congestion loss. Furthermore, if the network is congested then the recent loss rates would be expected to be consistently high. For example, on a network link with 98 Mbps bandwidth, if the load is 100 Mbps, the recent loss rates will consistently be equal to or greater than 2% until the load is reduced.

Figure 3:
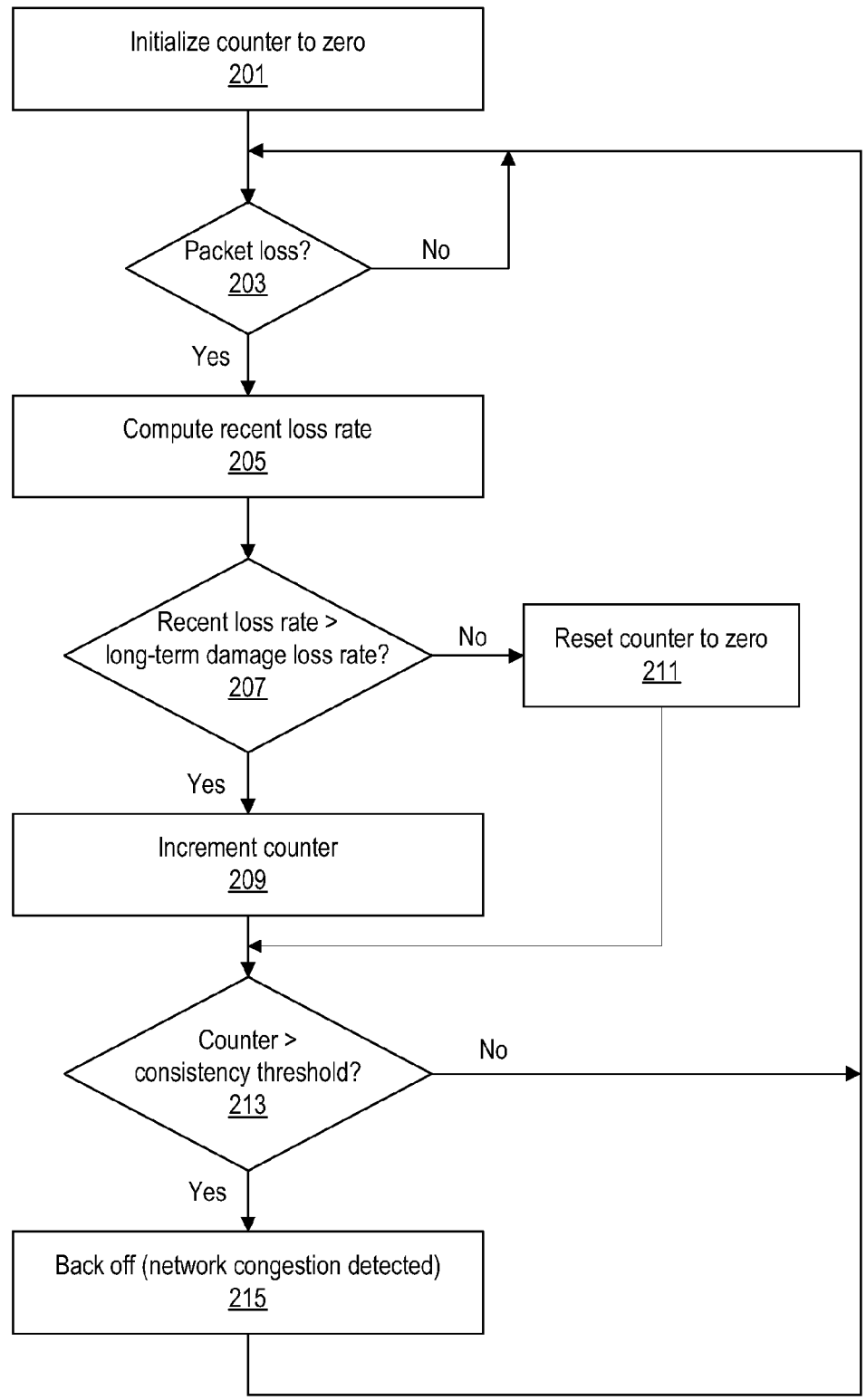
FIG. 3 is a flowchart diagram illustrating one embodiment of a consistency-based detection method.

The consistency-based detection method uses the above observation that congestion loss is consistent while damage loss is not in order to distinguish congestion loss from damage loss. FIG. 3 is a flowchart diagram illustrating one embodiment of the consistency-based detection method. The consistency-based detection method may be implemented by the network software 150 executing on the sender node 100.

In the illustrated embodiment, the consistency-based detection method uses a counter variable which tracks the number of consecutive occurrences for which the respective recent loss rate computed when a packet loss is detected is greater than the measured long-term damage loss rate. As indicated in 201, the counter may be initialized to zero, e.g., before transmission of the data packets has begun.

In 203 the method determines whether a packet loss has occurred. In various embodiments any of various techniques may be used to detect a packet loss. For example, in some embodiments a packet loss may be detected if a threshold number (e.g., three) of duplicate ACK messages are received from the receiver node 104. In other embodiments a packet loss may, for example, be detected when a timeout occurs, e.g., when a timer expires before receiving an ACK message for the packet. If a packet loss is detected in 203 then the operations illustrated in the subsequent blocks of the flowchart are performed.

In 205 a recent loss rate may be computed in response to the packet loss. The recent loss rate may be computed by dividing the number of lost packets by the number of fully transmitted packets since the previous recent loss rate (the recent loss rate associated with the previous packet loss) was computed.

In 207 the recent loss rate computed in 205 may be compared to the long-term damage loss rate to determine whether it is greater than the measured long-term damage loss rate. If so then the counter is incremented, as indicated in 209. The long-term damage loss rate may be measured by keeping track of the number of packet losses for which the loss is determined to be due to damage loss. In some embodiments the long-term damage loss rate may be based on the total number of packets that have been sent, e.g., by dividing the total number of packets lost due to damage loss by the number of total number of packets that have been sent. In other embodiments the long-term damage loss rate may be periodically recalculated. For example, for every X number of packets that are sent, the long-term damage loss rate may be calculated as the number of those packets that were lost due to damage loss divided by X. In such an embodiment, X may be a relatively large number, such as 100,000. Thus, a new long-term damage loss rate by be calculated after every 100,000 packets are sent, or the long-term damage loss rate may be based on a sliding window of the recent-most 100,000 packets.

For any given packet loss event for which the respective computed recent loss rate is greater than the long-term damage loss rate, the packet loss could be caused by either damage loss or congestion loss. However, if the respective recent loss rates computed for consecutive packet loss events are consistently high then the packet losses are most likely due to congestion loss. The counter may be used to measure the number of consecutive packet loss events for which the respective computed recent loss rates are greater than the long-term damage loss rate. The method may operate to determine whether the counter has surpassed a consistency threshold value, as indicated in 213. If so then the method concludes that congestion loss is present, thus indicating that it is necessary to back off on the rate of data transmission.

If the recent loss rate computed for the current packet loss is less than the long-term damage loss rate then the packet loss and recent preceding packet losses are most likely due to damage loss instead of congestion loss. Thus, in this case the counter is reset to zero, as indicated in 211.

Thus, if the counter surpasses the consistency threshold value, the consistency-based detection method has identified recent loss rates consistently above the long-term damage loss rate. As a result, the method concludes that the network is congested and that it is necessary to back off on the transmission rate. If the counter has not reached the threshold yet, the method cannot yet tell whether the packet loss is due to congestion loss. In this case, there is no reduction in the transmission rate.

As shown in 215, if congestion loss was detected then the method may cause the sender node 100 to back off on the rate at which it transmits data packets over the network 102. In various embodiments the rate back-off may be effected in various ways. For example, in some embodiments the network software 150 may comprise modified TCP software or other software that uses a congestion window for sending data packets, where the congestion window has a size which indicates how many data packets are allowed to be outstanding (e.g., where ACK messages for the outstanding packets have not yet been received). In these embodiments the packet transmission rate may be effectively reduced by reducing the size of the congestion window. In various embodiments, the size of the congestion window may be reduced by various amounts. In some embodiments the size of the congestion window may be reduced by half.

In various embodiments, the consistency threshold value used in 213 may be set to various values. The consistency threshold value is a tradeoff between detection speed and accuracy. With a large threshold, the speed of detection of congestion suffers. However, the probability of wrongly treating damage loss as congestion loss decreases. By choosing a proper consistency threshold, an acceptable false positive rate may be achieved without allowing the network to remain congested for a long period.

In some embodiments, if the counter is determined to be greater than the consistency threshold value in 213 then a "congestionRTT" value may be set to an estimate of the round-trip time for the current (lost) packet. The "congestionRTT" value may be used in a delay-based detection method, as described below. Since the current packet was lost, an exact RTT for the packet may not be known, but the RTT may be estimated based on round-trip times measured for one or more other packets that have been successfully sent and acknowledged, e.g., where the round-trip time for a given packet indicates how much time elapsed between the time the packet was sent and the time the ACK message for the packet was received.

In some embodiments the network software 150 executing on the sender node 100 may utilize the consistency-based detection method alone to perform congestion control. However, if the consistency-based detection method alone is used, the congestion control algorithm may not be fair to other network traffic, e.g., standard TCP traffic sent by other nodes on the network. For example, standard TCP software on other nodes on the network may detect congestion and back off before the consistency-based detection method implemented by the sender node 100 detects congestion and backs off. Thus, standard TCP software on other nodes may back off more frequently than the network software 150 on the sender node 100 and hence will get less bandwidth share.

In order to solve this fairness problem, the consistency-based detection method may be supplemented with another detection method to quickly detect congestion and cause the network software 150 on the sender node 100 to back off. For example, in some embodiments a delay-based detection method may be used in combination with the consistency-based detection method.

Figure 4:
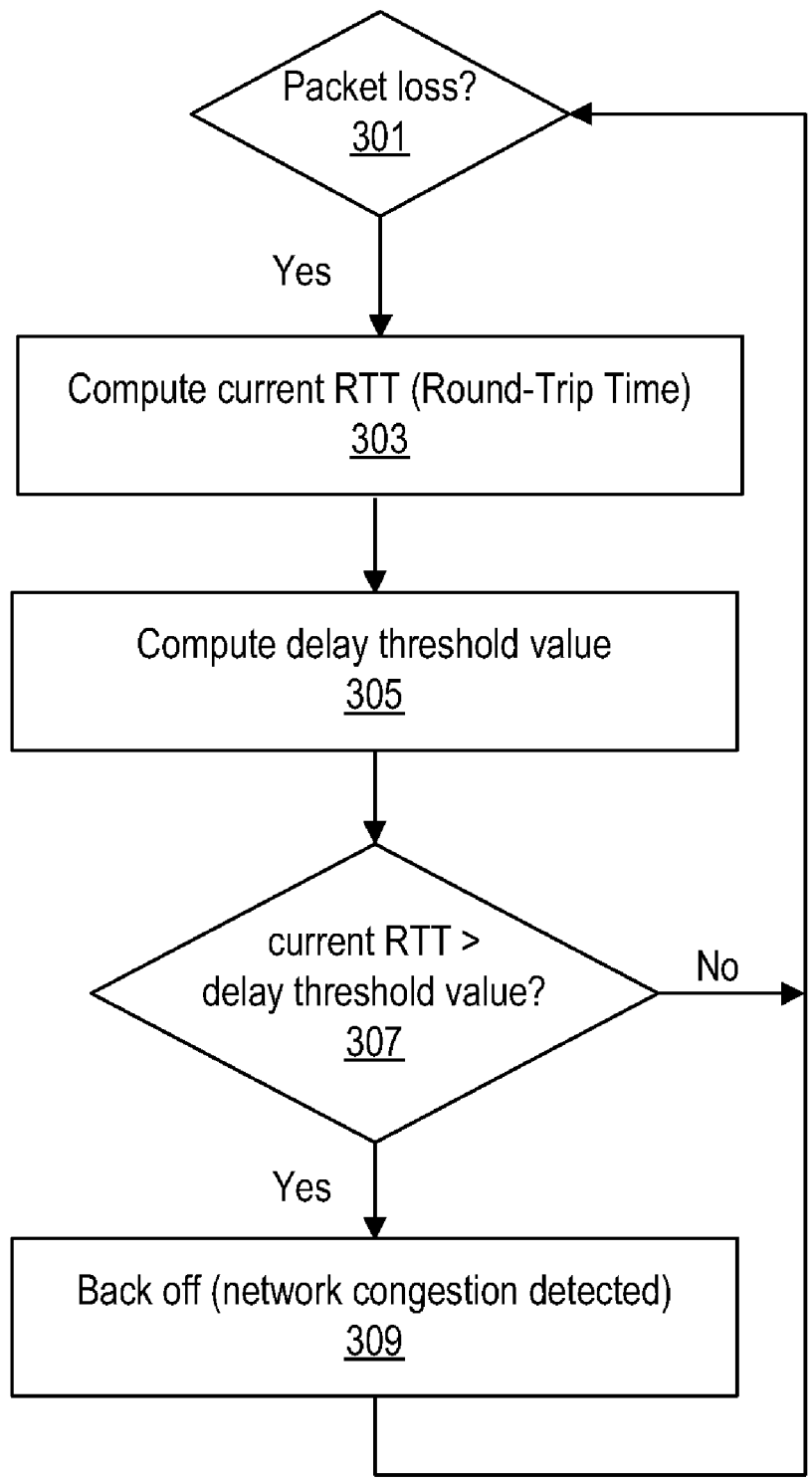
FIG. 4 is a flowchart diagram illustrating one embodiment of a delay-based detection method.

FIG. 4 is a flowchart diagram illustrating one embodiment of the delay-based detection method. In various embodiments the delay-based detection method may operate to determine whether the network is congested based on transmission times of packets on the network. For example, the delay-based detection method may make use of the observation that congestion loss is usually associated with increased RTT (Round-Trip Time). If a packet loss is associated with an increased RTT, the packet loss can quickly be characterized as a congestion loss, thus causing the network software 150 to back off on the transmission rate, e.g., by reducing the congestion window size.

In 301 the delay-based detection method determines whether a packet loss has occurred. If a packet loss is detected then the operations illustrated in the subsequent blocks of the flowchart are performed.

In 303 a current RTT (Round-Trip Time), e.g., the RTT for the lost packet, is estimated. In some embodiments the current RTT may be estimated based on round-trip times measured for one or more other packets that have been successfully sent and acknowledged.

In 305, a delay threshold value may be computed. The current RTT may be compared to the delay threshold value to determine whether it is greater than the delay threshold value, as indicated in 307. If so, then the delay-based detection method may conclude that the network is congested and may cause the network software 150 to back off on the transmission rate (e.g., by reducing the congestion window size), as indicated in 309.

If the current RTT is not greater than the delay threshold value then the packet loss is considered to be due to damage loss. A damage loss counter may be incremented, e.g., where the damage loss counter is used to measure the long-term damage loss rate.

In various embodiments the delay threshold value may be computed in various ways. As noted above, a "congestionRTT" value may be set in the consistency-based detection method, which is the current RTT when the consistency-based detection method asserts congestion loss based on loss consistency. This is typically the maximum RTT along the path because the queuing delay reaches its maximum and packets start to be dropped. In some embodiments the delay threshold value may be computed based on the "congestionRTT" value and a "baseRTT" value. The "baseRTT" value is an estimation of the transmission delay of a packet over the network path. The "baseRTT" value is the minimum RTT of the network path where queuing delay is zero. In various embodiments any of various techniques may be used to estimate the "baseRTT", such as techniques used in TCP Vegas and FAST TCP.

Thus, the queuing delay will be "congestionRTT" minus "baseRTT". To accommodate path change, the delay-based detection method may be disabled periodically to trigger the consistency-based detection method to measure a new "congestionRTT" value. The "baseRTT" value may be measured periodically by taking the minimum RTT in each period as the "baseRTT" value.

In some embodiments the delay threshold value may be set to a value between the "baseRTT" value and the "congestionRTT" value. For example, in some embodiments the delay threshold value may be set to "baseRTT"+0.5*("congestionRTT"−"baseRTT"). For a packet loss that has an RTT lower than the delay threshold, the packet loss is treated as damage loss. Only when an RTT is greater than the delay threshold and loss occurs does the sender node 100 back off.

When the network link is not fully utilized, RTT is "baseRTT" and is less than the delay threshold. Even if there are damage losses, the packet losses will not trigger a backoff. Thus, link utilization can be maintained in the face of non-negligible damage loss. When competing with standard TCP, the RTT usually is close to "congestionRTT" and is greater than the delay threshold. By using the delay-based detection method, the network software 150 on the sender node 100 may detect congestion with a single packet loss as quickly as standard TCP. Thus, the sender node 100 may back off as frequently as nodes using standard TCP software, and hence fairness is maintained.

It may seem that the delay threshold value should be set to "congestionRTT" since congestion loss should associate with maximum RTT. However, in practice the RTT measurement is not completely accurate. A lost packet will experience the maximum queuing delay. However, since the packet is lost, an RTT sample for the packet cannot be obtained. Instead, the RTT for the packet is estimated from one or more delivered packets before and/or after the lost packet. The delivered packets may not experience the maximum queuing delay due to network dynamics. However, "congestionRTT" is typically the maximum RTT because the consistency-based detection method is measured over more samples during congestion. This increases the probability for "congestionRTT" to be set to the maximum RTT. If the delay threshold value is set to "congestionRTT", some congestion loss may not be associated with a large enough RTT and is then treated as damage loss. Traffic sent by the sender node 100 would gain more bandwidth share than standard TCP traffic because the sender node 100 would not back off for some congestion losses. This would increase the congestion detection false negative rate. Thus, the delay threshold value should not be set to "congestionRTT".

In addition, the delay threshold value should not be set to "baseRTT". If the delay threshold value is set to "baseRTT" then the best fairness to standard TCP traffic is obtained because the sender node 100 would back off whenever there is a packet loss. In this case however, the sender node 100 is no longer robust to damage loss. Due to processing delay variance, even when the link is not fully utilized, it is still possible that the RTT becomes slightly greater than "baseRTT". When this happens, damage loss will be treated as congestion loss. This increases the congestion detection false positive rate.

Thus, the delay threshold value is a tradeoff between robustness to damage loss and fairness to standard TCP traffic. Thus, in some embodiments, the delay threshold value may be set to a value between the "baseRTT" value and the "congestionRTT" value. For example, in some embodiments, half of the queuing delay may be used as a balance point, e.g., as given above by the formula of "delay threshold value"="baseRTT"+0.5*("congestionRTT"−"baseRTT").

Figure 5:
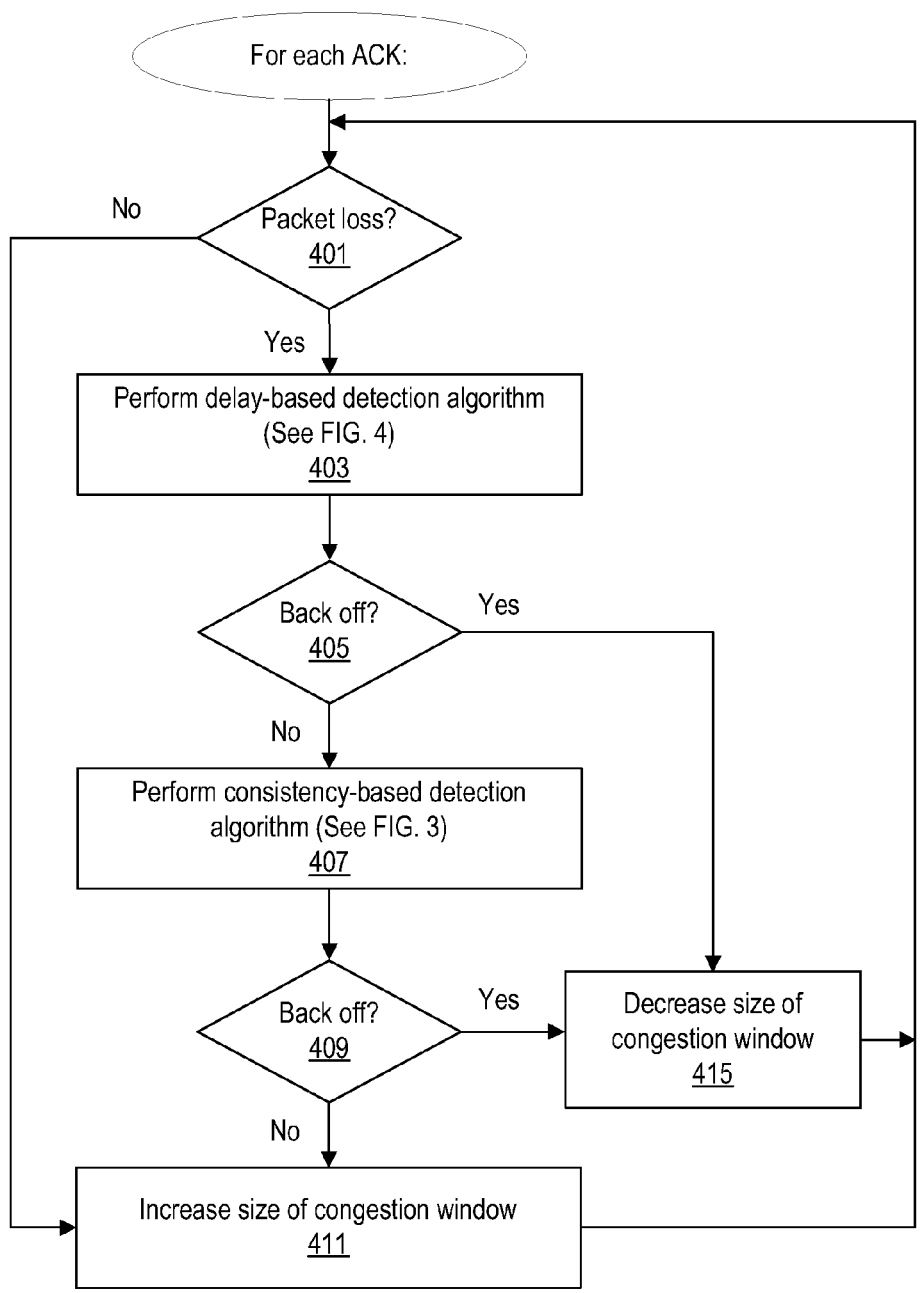
FIG. 5 is a flowchart diagram illustrating one embodiment of a congestion control method that uses the delay-based detection method in conjunction with the consistency-based detection method.

FIG. 5 is a flowchart diagram illustrating one embodiment of a congestion control method that uses the delay-based detection method in conjunction with the consistency-based detection method. The blocks shown in the flowchart may be performed by the network software 150 in response to each ACK message received.

In 401 the method determines whether a packet loss has occurred, e.g., by determining whether three duplicate ACK messages have been received or determining that a timeout has occurred.

If a packet loss has not occurred then the network is not detected to be congested. In this case, the rate of data transmission may be increased in some embodiments, e.g., by increasing the size of the congestion window as indicated in 411. For example, in some embodiments the size of the congestion window may be increased by w=w+1/w, where w is the size of the congestion window. In other embodiments the rate of data transmission may not be changed.

If, on the other hand, a packet loss has occurred then the delay-based detection method may be performed, similarly as discussed above with reference to FIG. 4. If the delay-based detection method does not detect that the transmission rate should be backed off then the consistency-based detection algorithm may be performed, similarly as discussed above with reference to FIG. 3. If the consistency-based detection method also does not detect that the transmission rate should be backed off then the packet loss is considered to be due to damage loss (random loss), and thus the size of the congestion window may be increased, as indicated in 411.

Otherwise, if either the delay-based detection algorithm or the consistency-based detection algorithm detects that the transmission rate should be backed off, e.g., due to determining that the network is congested, then the transmission rate may be reduced. For example, the size of the congestion window may be decreased, as indicated in 415.

Thus, the method of FIG. 5 keeps increasing the congestion window size for each received ACK message if neither algorithm detects congestion loss. Thus, the sender node 100 may continue to increase its send rate until the network is congested.

FIG. 6 illustrates pseudocode corresponding to the method of FIG. 5. The delay-based detection method is implemented by the function "delay_based_detection( )". The consistency-based detection method is implemented by the function "consitency_based_detection( )". The "detect_congestion( )" function calls these respective functions and either increases or decreases the size of the congestion window, depending upon whether either function detects congestion loss.

The pseudocode of FIG. 6 also illustrates computation of the long-term damage loss rate, "DLR". This value is measured as follows. When a packet is lost and the RTT is less than the delay threshold value, the packet loss is counted as damage loss (indicated by incrementing the "damage loss" counter in the "delay_based_detection( )" function. For every 100,000 transmitted packets, a new DLR is computed from the number of lost packets due to damage. Choosing a 100,000-packet sample size allows the sender node 100 to have a loss rate resolution of $10^{-5}$ while allowing changes to the damage loss rate to be accounted for over time.

In summary, normally the delay-based detection algorithm is in charge of congestion detection. It will back off as quickly as standard TCP when congestion is experienced. Thus, fairness is maintained. At the same time, the delay-based detection algorithm is able to ignore damage loss when the network is not congested, and thus efficiency is maintained in the face of damage loss.

One potential problem in the delay-based detection algorithm is that it may not be able to detect congestion when the network path becomes shorter. In this extreme case, the consistency-based detection algorithm takes over and detects congestion, and congestion collapse is avoided. The consistency-based detection therefore serves two purposes. First, it measures the "congestionRTT" value used by the delay-based detection algorithm. Second, when the delay-based detection algorithm has false negatives, the consistency-based detection algorithm provides another defense to avoid congestion collapse.

Evaluations on a test system utilizing one embodiment of the method of FIG. 5 have indicated that the method enables full utilization of all available bandwidth in the face of damage loss without sacrificing fairness.

It is noted that various embodiments may further include receiving, sending or storing instructions and/or data implemented in accordance with the foregoing description upon a computer-readable memory medium. Generally speaking, a computer-readable memory medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. for storing program instructions. Such a computer-readable memory medium may store program instructions received from or sent on any transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer-readable storage medium comprising program instructions executable to implement a method comprising:
   determining a damage loss rate, wherein the damage loss rate indicates a loss rate of packets due to network transmission error and unrelated to network congestion, and wherein determining the damage loss rate comprises dividing a number of packets lost due to network transmission error by a number of packets transmitted over a network;
   after determining the damage loss rate, sending a plurality of packets over the network;
   detecting a plurality of packet losses among the plurality of packets sent over the network;
   in response to each packet loss:
      determining a respective recent packet loss rate, comprising, for the first packet loss, dividing a number of lost packets by a number of packets transmitted since transmission was started, and for a subsequent packet loss, dividing a number of lost packets by a number of packets transmitted since the previous recent packet loss rate was determined;
      determining whether the respective recent packet loss rate is greater than the damage loss rate;
      if the respective recent packet loss rate is greater than the damage loss rate, incrementing a counter;
      if the respective recent packet loss rate is not greater than the damage loss rate, resetting the counter;
      determining whether the counter exceeds a threshold value;
      if the counter exceeds the threshold value, adjusting a rate of sending subsequent packets over the network; and
      if the counter does not exceed the threshold value, maintaining the rate of sending subsequent packets over the network.

2. The non-transitory computer-readable storage medium of claim 1, wherein adjusting the rate of sending subsequent packets over the network comprises decreasing the rate.

3. The non-transitory computer-readable storage medium of claim 1, wherein adjusting the rate of sending subsequent packets over the network comprises increasing the rate.

4. The non-transitory computer-readable storage medium of claim 1, wherein the damage loss rate comprises a long-term damage loss rate.

5. The non-transitory computer-readable storage medium of claim 1, wherein adjusting the rate of sending subsequent packets over the network comprises adjusting a size of a congestion window.

6. A method comprising:
   determining a damage loss rate, wherein the damage loss rate indicates a loss rate of packets due to network transmission error and unrelated to network congestion, and wherein determining the damage loss rate comprises dividing a number of packets lost due to network transmission error by a number of packets transmitted over a network;
   after determining the damage loss rate, sending a plurality of packets over the network;
   detecting a plurality of packet losses among the plurality of packets sent over the network;
   in response to each packet loss:
      determining a respective recent packet loss rate, comprising, for the first packet loss, dividing a number of lost packets by a number of packets transmitted since transmission was started, and for a subsequent packet loss, dividing a number of lost packets by a number of packets transmitted since the previous recent packet loss rate was determined;

determining whether the respective recent packet loss rate is greater than the damage loss rate;

if the respective recent packet loss rate is greater than the damage loss rate, incrementing a counter;

if the respective recent packet loss rate is not greater than the damage loss rate, resetting the counter;

determining whether the counter exceeds a threshold value;

if the counter exceeds the threshold value, adjusting a rate of sending subsequent packets over the network; and if the counter does not exceed the threshold value, maintaining the rate of sending subsequent packets over the network.

7. The method of claim 6, wherein adjusting the rate of sending subsequent packets over the network comprises decreasing the rate.

8. The method of claim 6, wherein adjusting the rate of sending subsequent packets over the network comprises increasing the rate.

9. A system comprising:

one or more processors; and memory storing program instructions;

wherein the program instructions are executable by the one or more processors to:

determine a damage loss rate, wherein the damage loss rate indicates a loss rate of packets due to network transmission error and unrelated to network congestion, and wherein determining the damage loss rate comprises dividing a number of packets lost due to network transmission error by a number of packets transmitted over a network;

after determining the damage loss rate, send a plurality of packets over the network;

detect a plurality of packet losses among the plurality of packets sent over the network;

in response to each packet loss:

determine a respective recent packet loss rate, comprising, for the first packet loss, dividing a number of lost packets by a number of packets transmitted since transmission was started, and for a subsequent packet loss, dividing a number of lost packets by a number of packets transmitted since the previous recent packet loss rate was determined;

determine whether the respective recent packet loss rate is greater than the damage loss rate;

if the respective recent packet loss rate is greater than the damage loss rate, increment a counter;

if the respective recent packet loss rate is not greater than the damage loss rate, reset the counter;

determine whether the counter exceeds a threshold value;

if the counter exceeds the threshold value, adjust a rate of sending subsequent packets over the network; and if the counter does not exceed the threshold value, maintain the rate of sending subsequent packets over the network.

* * * * *